(12) United States Patent
Robb

(10) Patent No.: US 9,027,543 B2
(45) Date of Patent: May 12, 2015

(54) FIRE SAFE CAMP STOVE AND FIRE PIT

(76) Inventor: Michael V. Robb, Trinidad, CO (US)

( * ) Notice: Subject to any disclaimer, the term of this patent is extended or adjusted under 35 U.S.C. 154(b) by 459 days.

(21) Appl. No.: 13/470,916

(22) Filed: May 14, 2012

(65) Prior Publication Data

US 2013/0298895 A1 Nov. 14, 2013

(51) Int. Cl.
*A47J 37/07* (2006.01)
*A47J 33/00* (2006.01)
*F24C 1/16* (2006.01)

(52) U.S. Cl.
CPC *A47J 33/00* (2013.01); *A47J 37/07* (2013.01); *F24C 1/16* (2013.01)

(58) Field of Classification Search
CPC ... A47J 37/0704; A47J 37/0763; A47J 33/00; A47J 2037/0777; A47J 237/07; A47J 2037/07; F24C 1/16; F24C 3/14; F24B 3/00; F24B 1/205
USPC .................. 126/25 R, 30, 40, 50.9 R, 9 B
See application file for complete search history.

(56) References Cited

U.S. PATENT DOCUMENTS

| 2,161,669 | A | | 6/1939 | Freeman |
| 3,378,002 | A | | 4/1968 | Hink |
| 3,851,639 | A | | 12/1974 | Beddoe |
| 4,077,387 | A | | 3/1978 | Bateman |
| 4,651,708 | A | | 3/1987 | Groeneweg |
| 5,752,497 | A | * | 5/1998 | Combs et al. ............... 126/25 R |
| 6,640,803 | B2 | | 11/2003 | Davis et al. |

* cited by examiner

*Primary Examiner* — Alfred Basichas
(74) *Attorney, Agent, or Firm* — Trenner Law Frim, LLC; Mark D. Trenner

(57) ABSTRACT

A fire safe camp stove and fire pit device is disclosed. An example device includes a fire chamber. A first cooking surface is provided directly over the fire chamber. A lid is movable between an open position and a closed position. The lid in the open position provides access to the first cooking surface. The lid in the closed position provides a second cooking surface above the first cooking surface.

16 Claims, 4 Drawing Sheets

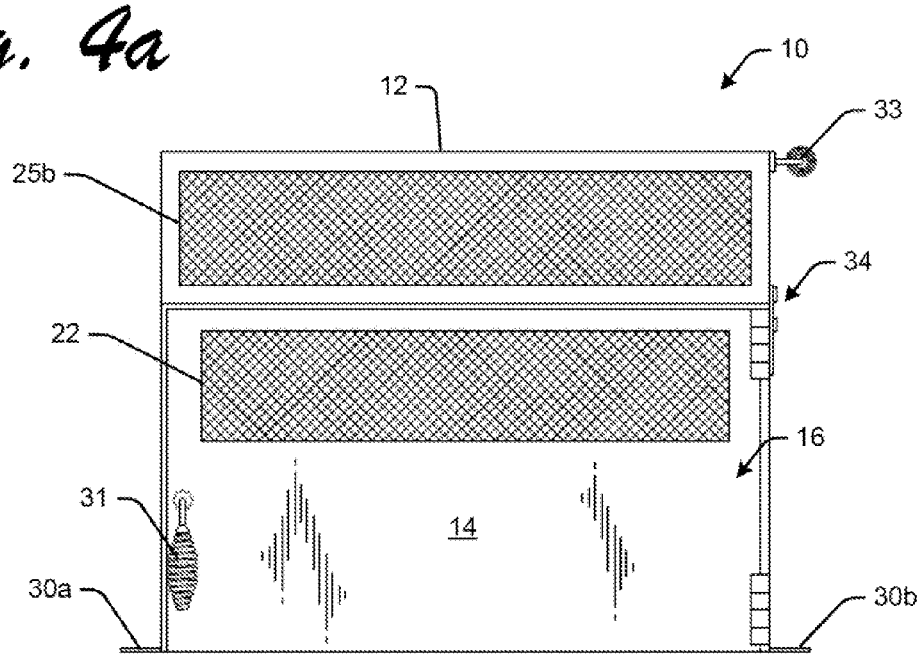
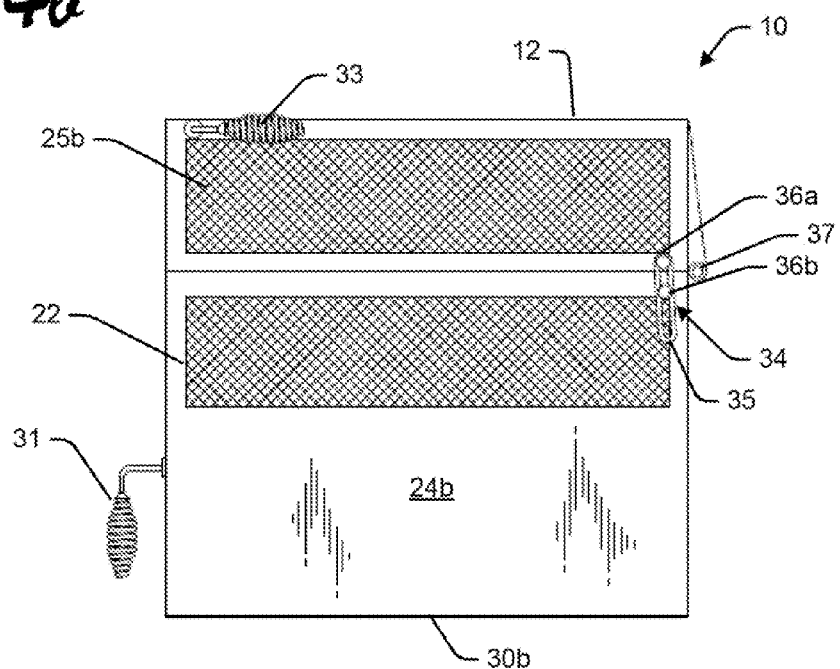

FIRE SAFE CAMP STOVE AND FIRE PIT

BACKGROUND

People enjoy cooking over an open fire, for example, when camping or picnicking. People also enjoy sitting around an open fire and conversing or simply watching the flames outdoors. Of course, the fire may also provide warmth especially in the cooler morning and evening hours. The use of open fires is not limited to use in the great outdoors at parks or campgrounds, and fire pits are commercially available that can be used at home in backyards and on patios.

Unfortunately, the increase in wildfires has led to more restrictions on open fires. These restrictions are especially prevalent during times of drought, and may outright ban any uncontained fire.

BRIEF DESCRIPTION OF THE DRAWINGS

FIGS. 4a-b are (a) front plan and (b) side plan views of the example device shown in FIG. 1.

DETAILED DESCRIPTION

A fire safe camp stove and/or fire pit is disclosed. Fire burning restrictions include ordinances requiring developed campgrounds to provide permanent fire pits with a covering grate. The fire safe camp stove and/or fire pit disclosed herein complies with strict ordinances in fire risk areas.

An example fire safe camp stove and fire pit device includes a fire chamber, a first cooking surface directly over the fire chamber, and a lid. The lid is movable between an open position and a closed position. The lid in the open position provides access to the first cooking surface. In the closed position, the lid provides a second cooking surface above the first cooking surface.

During use, firewood and/or other fuel (e.g., synthetic fire logs) may be loaded inside the fire chamber through a front door access. A fire is ignited, and the lid and front door can be closed for campfires, thus completely containing flames and eliminating the risk of wind blowing debris and ash.

For cooking, the lid may be opened and food to be cooked (e.g., hamburgers, hot dogs, steaks, etc.) can be placed directly, and/or in pots, pans, or other cooking vessels, on the first cooking surface. The lid may then be closed over the food, thus increasing heat on the first cooking surface. When the lid is closed, other foods may be placed on this second cooking surface for lower-heat cooking (e.g., warming bread).

The fire safe camp stove and fire pit device dampens and eliminates 95% or more of sparks emitted from a fire burning in the fire chamber, and completely contains the flames. The flames are still visible from all sides, allowing the users to enjoy the ambiance of a campfire without the risk of an open fire.

Before continuing, it is noted that as used herein, the terms "includes" and "including" mean, but is not limited to, "includes" or "including" and "includes at least" or "including at least."

Figure 1:
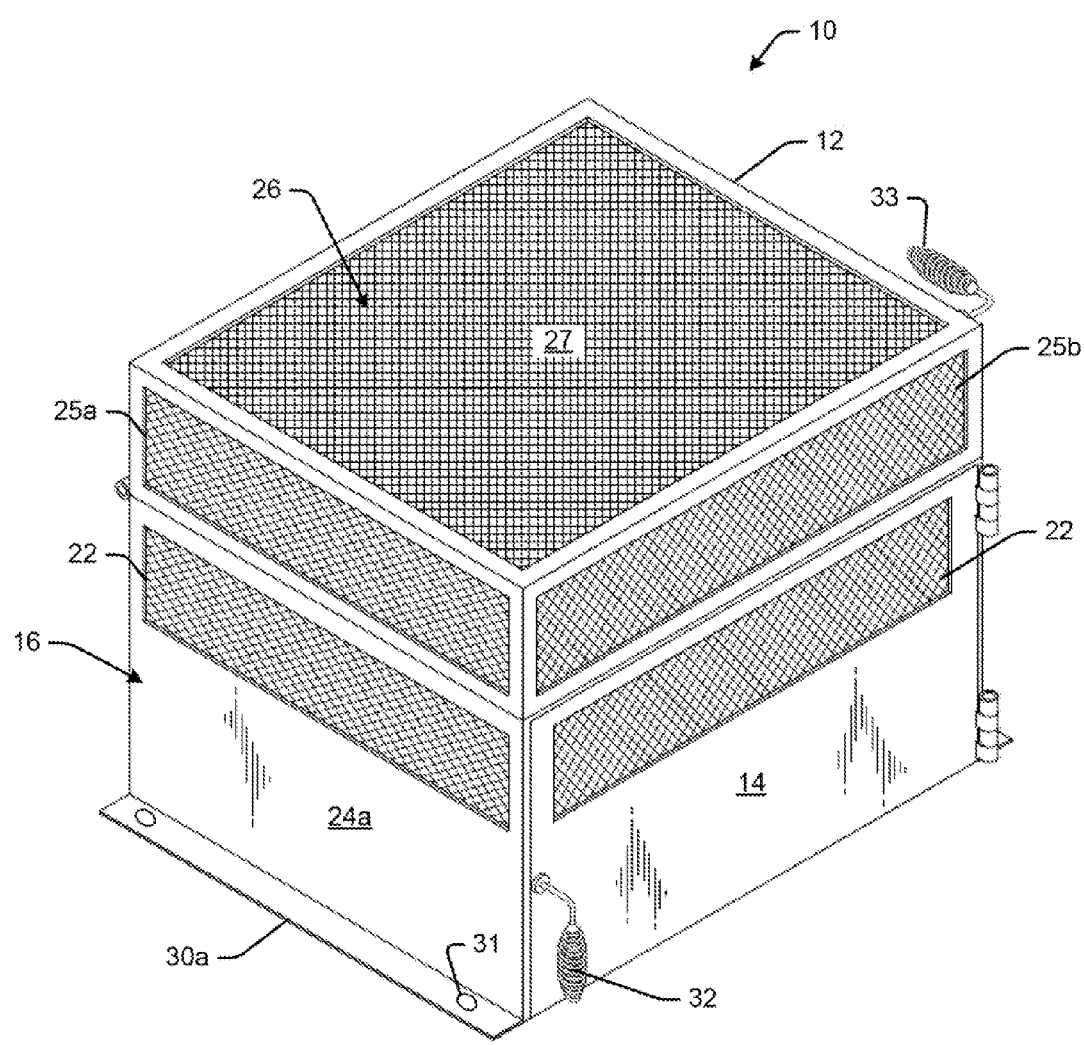
FIG. 1 is a perspective view of an example fire safe camp stove and fire pit device.
Figure 2:
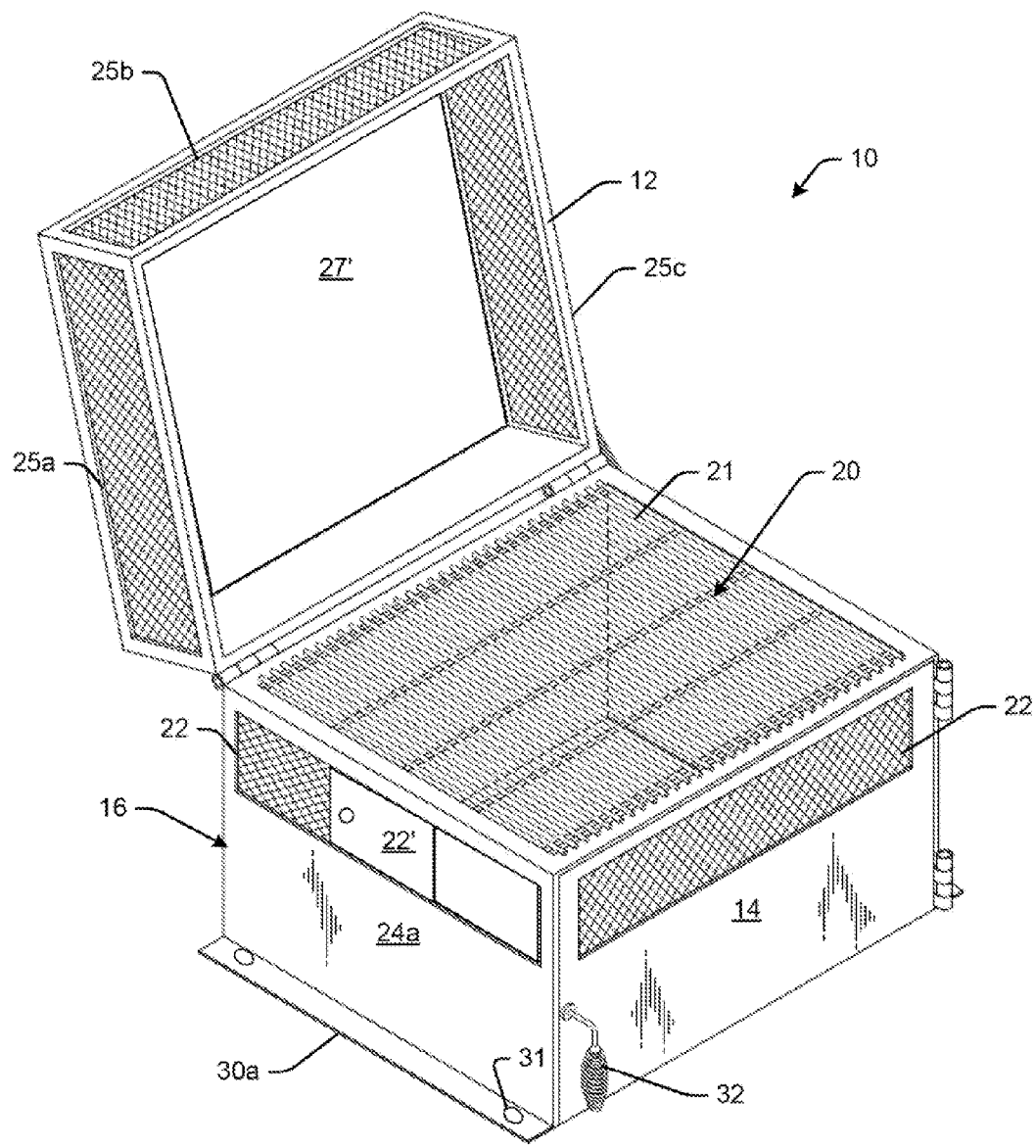
FIG. 2 is another perspective of the example device shown in FIG. 1, wherein a lid is shown in an open position to provide access to a first cooking surface.
Figure 3:
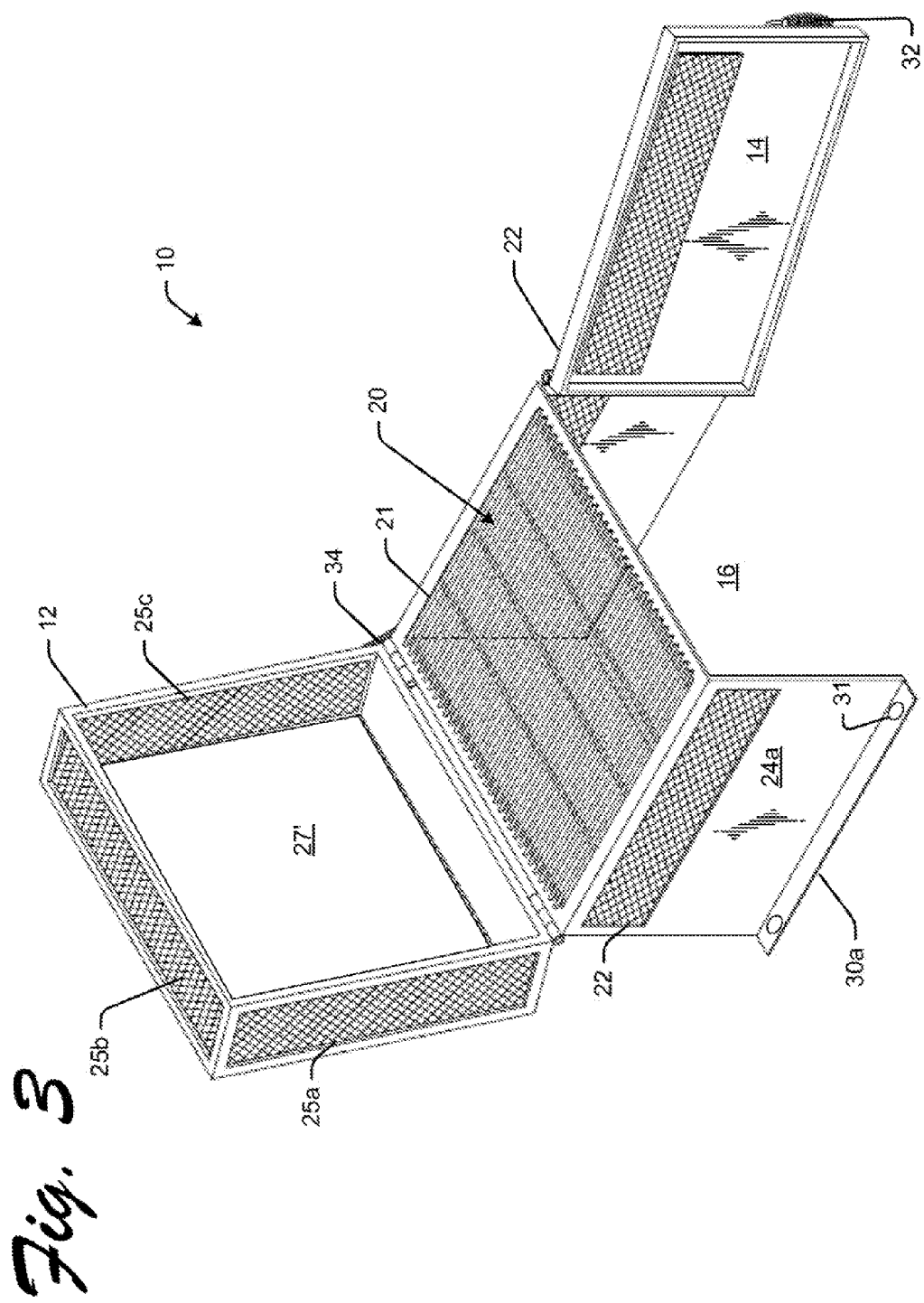
FIG. 3 is another perspective of the example device shown in FIG. 1, wherein an access door is shown in an open position to provide access to a fire chamber.

FIG. 1 is a perspective view of an example fire safe camp stove and fire pit device 10. FIG. 2 is another perspective of the example device 10 shown in FIG. 1, wherein the lid 12 is shown in the open position. FIG. 3 is another perspective of the example device 10 shown in FIG. 1, wherein an access door 14 is shown in an open position.

The device 10 includes a fire chamber 16, and a lid 12 which can be opened and closed over a first cooking surface 20. As its name implies, fuel (e.g., firewood or other fuel source) may be added to the fire chamber 16 (e.g., through access door 14). The first cooking surface 20 is provided directly over the fire chamber 16, and thus experiences a fair amount of heat generated by the fire burning in (and/or coals smoldering in) the fire chamber 16.

During use, the lid 12 and access door 14 can be closed to contain the flames. This also reduces the risk of blowing debris and ash. But heat from the fire can still be felt by people standing or sitting in the vicinity of the device 10, and the flames are still visible through screens 22 provided in one or more of the sidewalls of the fire chamber 16 (only screens in sidewalls 24a-b and access door 14 are visible in the drawings, but the back wall may also have a screen) and/or screens (three screens 25a-c are shown in FIG. 2, a screen on the back wall of the lid may or may not be provided) provided in one or more of the sidewalls of the lid 12.

It is noted that the screens may have any suitable mesh size. The mesh size may depend at least to some extent on the intended use and/or compliance with area ordinances or burning restrictions. In addition, plates may be provided (e.g., to snap in or slide into place) for use over the screens, e.g., to reduce the amount of smoke, to increase heat for cooking, or to dampen the fire after use.

The lid 12 may be moved to the open position (shown in FIG. 2) to provide access to the first cooking surface 20. For example, food to be cooked (e.g., hamburgers, hot dogs, steaks, etc.) can be placed directly on the first cooking surface 20. Food in pots, pans, or other cooking vessels may also be placed on the first cooking surface 20. The lid 12 may then be closed over the food and/or cooking vessels to increase heat for food on the first cooking surface.

When closed, the lid 12 may also provide a second cooking surface 26 above the first cooking surface 20. In an example, the second cooking surface can be used for larger cooking utensils such as coffee pots. Because the second cooking surface 26 is farther away from the fire chamber 16, the second cooking surface 26 may also be maintained at a lower temperature than the first cooking surface 20, and thus is suitable for warming (e.g., warming bread or maintaining the temperature of foods which have already been cooked).

It is noted that the access door 14 enables the user to add fuel to the fire without having to remove any of the food cooking on either of the cooking surfaces.

A cooking grate 21 is shown forming the first cooking surface 20, and a cooking plate 27 is shown forming the second cooking surface 26. The cooking grate 21 and/or cooking plate 27 can be any suitable grate, such as but not limited to, an expanded metal cooking grate, a rounded rod cooking grate, or a flat plate with perforations. In another example, the cooking plate 27 may include a solid surface or mostly solid surface (e.g., with vents). It is noted that the grate 21 and cooking plate 27 may be interchangeable between the first cooking surface 20 and the second cooking surface 26. That is, the cooking grate 21 may be used on the second cooking surface 26 and/or the cooking plate 27 can be used on the first cooking surface 20. In addition, a cooking plate and/or cooking grate may be used on both the first and second cooking surfaces.

A baffle 27' is shown below the cooking plate 27, and may be provided in spaced apart relation to the cooking plate 27 (e.g., hanging about 1 inch below the cooking plate 27). The baffle 27' routes smoke around to the edges of the cooking plate 27, while also retaining heat adjacent the second cooking surface. The baffle 27' may be solid or partially solid (e.g., with vents).

It is noted that other features may also be included for the fire safe camp stove and fire pit device 10. By way of illustration, and not intending to be limiting, a damper 22' (shown partially closed in FIG. 2 for purposes of illustration) may be provided on one or more side and/or in the access door 14 to the fire chamber. The damper 22' may slide open and closed (or pull open and closed) to enable a user to regulate airflow to the fire chamber and thus increase/decrease temperature, smoke, and how fast the fire is burning. In another illustration, a container (not shown) may be provided in the fire chamber so that coals can be moved closer to and/or farther away from the first cooking surface 20. The container may be mounted in the fire chamber or positioned in the fire chamber. The container may be removable and adjustable in height.

The fire safe camp stove and fire pit device 10 may be installed in campgrounds and parks and other areas where forest and grass fires are a concern. The device 10 may include an anchoring mechanism. For example, the device 10 is shown in the drawings having a mounting plate 30*a-b* with openings 31 formed therethrough for anchoring on bolts set in concrete (not shown), or anchoring in the ground with stakes (also not shown). Anchoring may be used as a security measure (e.g., so that the device 10 is not readily moved or removed), aids in longevity of the device 10 (by preventing the device from being moved about and possibly damaged), and makes the device easier to clean (by preventing the device from tipping over).

It is noted that the device 10 is not limited to any size or shape. For example, the device 10 may be provided in any size, such as smaller units for backyards, larger units for individual campsites, and even larger units for group campsites. The device 10 may be any shape, such as the substantially square shape shown in the drawings, or octagonal, round, or any other desired shape. In addition, the lid 12 and/or access door 14 may include one or more handles 32 and 33, respectively.

It should be appreciated that the device 10 greatly reduces or altogether eliminates sparks from being emitted to the surrounding environment. The device 10 also encloses the flame and retains ash and debris, thus reducing the possibility of starting a wildfire.

FIGS. 4*a-b* are front and side plan views of the example device shown in FIG. 1. A lock 28 is visible on the right side (although the lock 28 may be provided on either or both sides). In an example, the lock 34 includes a link 35 on pins 36*a-b* which are in turn mounted on the sidewall 24 of the fire chamber 16 and the lid 12, respectively. The pins 36*a-b* may include heads to retain the link 35 on the pins 36*a-b*, such that the link 35 can slide on the pins 36*a-b* without falling off of the pins 36*a-b*. The lock 34 enables the lid 12 to be readily raised and lowered, but limits a range of motion of the lid 12. That is, the lock 34 may serve as a limiter so that the lid 12 will only open to about 90 degrees relative to the first cooking surface 20 (e.g., as shown in FIG. 2). The lock 34 may also work in conjunction with a heavy duty spring on the hinge 37. The lock 34 may also serve to hold the lid 12 in place and thus prevent the lid from unintentionally closing, or slamming shut (e.g., by the wind).

It is noted that the examples shown and described are provided for purposes of illustration and are not intended to be limiting. Still other examples are also contemplated.

The invention claimed is:

1. A fire safe camp stove and fire pit device, comprising:
 a fire chamber;
 a first cooking surface directly over the fire chamber;
 a lid, movable between an open position and a closed position, the lid in the open position providing access to the first cooking surface, and the lid in the closed position providing a second cooking surface above the first cooking surface; and
 a cooking grate and a cooking plate interchangeable between the first cooking surface and the second cooking surface.

2. The device of claim 1, further comprising an access door opening to the fire chamber.

3. The device of claim 1, wherein the lid is moved to the closed position for campfires to enclose any flames in the fire chamber and reduce risk of blowing debris and ash outside of the fire chamber.

4. The device of claim 1, wherein the second cooking surface is at a lower warming temperature than the first cooking surface during use.

5. The device of claim 1, wherein the first cooking surface is at a higher cooking temperature when the lid is in the closed position than when the lid is in the open position.

6. The device of claim 1, further comprising a mounting plate for anchoring on bolts set in concrete.

7. The device of claim 1, further comprising a mounting plate for anchoring in the ground with stakes.

8. A fire safe camp stove and fire pit device, comprising:
 a ventilated fire chamber with access door to add fuel to the fire chamber;
 a cooking grate on the fire chamber;
 a hinged lid opening to provide access to a higher temperature first cooking surface, and the lid closing to provide a lower temperature second cooking surface, wherein the hinged lid encloses flames in the fire chamber and reduces risk of blowing debris and ash outside of the fire chamber; and
 a cooking plate interchangeable with the cooking grate between the first cooking surface and the second cooking surface.

9. The device of claim 8, further comprising, a baffle between the first and second cooking surfaces.

10. The device of claim 8, further comprising a damper to control airflow in the ventilated fire chamber.

11. The device of claim 8, further comprising a mounting plate on a bottom edge of the fire chamber for anchoring the device to the ground.

12. The device of claim 8, further comprising a lock to limit a range of motion of the lid.

13. A method comprising:
 providing access to a fire chamber to add fuel for a fire;
 providing a first cooking surface as a cooking grate on the fire chamber;
 providing access to the cooking grate under a lid; and
 providing a second cooking surface on top of the lid as a cooking plate; and
 wherein the cooking plate is interchangeable with the cooking grate.

14. The method of claim 13, further comprising completely enclosing flames in the fire chamber.

15. The method of claim 13, further comprising eliminating blowing debris and ash outside of the fire chamber.

16. The method of claim 13, further comprising anchoring the fire chamber to the ground.

\* \* \* \* \*